US012749900B2

(12) United States Patent
Prakash et al.

(10) Patent No.: US 12,749,900 B2
(45) Date of Patent: Sep. 29, 2026

(54) SYSTEM AND METHOD FOR THE ENERGY MANAGEMENT AND CONTROL OF MICROGRIDS

(71) Applicant: Honeywell International Inc., Charlotte, NC (US)

(72) Inventors: Suraj Prakash, Bengaluru (IN); Jagadeesha Halmuthur Seetharama Joish, Bengaluru (IN)

(73) Assignee: Honeywell International Inc., Charlotte, NC (US)

( * ) Notice: Subject to any disclaimer, the term of this patent is extended or adjusted under 35 U.S.C. 154(b) by 494 days.

(21) Appl. No.: 18/209,712

(22) Filed: Jun. 14, 2023

(65) Prior Publication Data

US 2024/0421601 A1 Dec. 19, 2024

(51) Int. Cl.

*H02J 3/46* (2026.01)
*H02J 3/38* (2006.01)
*H02J 101/10* (2026.01)
*H02J 101/24* (2026.01)

(52) U.S. Cl.

CPC ................ *H02J 3/46* (2013.01); *H02J 3/381* (2013.01); *H02J 2101/10* (2026.01); *H02J 2101/24* (2026.01)

(58) Field of Classification Search

CPC .......... H02J 3/46; H02J 3/381; H02J 2300/24; H02J 2300/10

See application file for complete search history.

(56) References Cited

U.S. PATENT DOCUMENTS

| | | | | |
|---|---|---|---|---|
| 9,323,299 | B2 * | 4/2016 | Jackson | G06F 1/26 |
| 9,419,442 | B2 * | 8/2016 | Rahman | H02J 4/00 |
| 9,870,593 | B2 | 1/2018 | Sedighy et al. | |
| 9,906,039 | B2 * | 2/2018 | Vogel | H02M 3/285 |
| 10,832,353 | B2 | 11/2020 | Hazra et al. | |
| 11,251,620 | B2 | 2/2022 | Cai et al. | |
| 2015/0039145 | A1 * | 2/2015 | Yang | G05B 13/02<br>700/291 |
| 2016/0313716 | A1 * | 10/2016 | Chen | H02J 13/1323 |
| 2017/0005515 | A1 * | 1/2017 | Sanders | H02J 3/14 |

(Continued)

*Primary Examiner* — Scott T Baderman
*Assistant Examiner* — Mario M Velez-Lopez
(74) *Attorney, Agent, or Firm* — Alston & Bird LLP

(57) ABSTRACT

A system and method for controlling a microgrid network comprises a plurality of distributed energy resources that supply electrical power to a plurality of loads. A controller coupled to the microgrid network and to the distributed energy resources and the loads includes a processor and a memory configured to execute a dispatch controller function block. The function block is configured to cause the processor to receive a total power demand of all the loads coupled to the microgrid network and at least one operational constraint corresponding to the plurality of distributed energy resources and cause the processor to determine using the operational constraint if there is sufficient electrical power available from the plurality of distributed energy resources to power the loads. The function block is further configured to determine which of the plurality of available distributed energy resources are required to be adjusted to supply electrical power to the plurality of the loads, causing the controller to adjust the electrical power output by each of the distributed energy resources.

18 Claims, 4 Drawing Sheets

(56) References Cited

U.S. PATENT DOCUMENTS

| | | | | |
|---|---|---|---|---|
| 2018/0269689 | A1* | 9/2018 | Rodriguez | H02J 3/46 |
| 2020/0336003 | A1* | 10/2020 | Narla | B60L 8/003 |
| 2021/0408794 | A1* | 12/2021 | Yan | H02J 3/32 |
| 2022/0255323 | A1* | 8/2022 | Mendizabal Abasolo | G06Q 10/0631 |
| 2023/0060100 | A1* | 2/2023 | Reddy | H02J 3/381 |
| 2023/0296034 | A1* | 9/2023 | O'Donnell | B63H 11/00 |
| 2024/0421601 | A1* | 12/2024 | Prakash | H02J 3/46 |

* cited by examiner

SYSTEM AND METHOD FOR THE ENERGY MANAGEMENT AND CONTROL OF MICROGRIDS

TECHNICAL FIELD

This disclosure is generally directed to energy management and control for power networks. More specifically, it relates to a system and method for the energy management and control of microgrids and/or power plant networks where distributed energy resources are deployed.

BACKGROUND

Microgrids are clusters of distributed energy resources (DERs) and loads that are served at distribution voltage levels. Microgrids may be operable in a grid-connected mode or an autonomous mode (islanded or isolated). A microgrid operates in an islanded mode when it is disconnected from the main utility grid in remote locations, such as industrial facilities and residential communities, not connectable to main utility grids and often rely on local dispatchable energy resources, such as, fossil-fuel thermal generation power generating plants including diesel gensets, micro gas turbines, etc., for their energy supply Microgrids in autonomous modes tend to primarily rely on dispatchable energy resources. Due to the high price of fossil fuels used in dispatchable energy resources, operation, control, and maintenance of microgrids tend to have high energy costs. Energy costs can be significantly reduced by incorporating intermittent energy resources, such as, for example, renewable energy resources, relying on wind, solar etc., to offset fossil fuel consumption.

Examples of different DERs are solar plants, diesel generators, battery energy storage systems (BESS) and wind farms, etc. In grid connected systems, a microgrid serves its internal loads and depending on load-generation balance could also potentially import or export power from/to the grid. Power plants typically have very minor internal loads, and the main objective is to export power to the main grid for honoring commercial agreements and earn revenue.

It is an object of the present invention to provide a simple user friendly and configurable system which allows the best utilization of DER resources in microgrid and/or power plant networks and to provide a number of executable control schemes for controlling the microgrid based on the types of DER resources connected to the microgrid.

SUMMARY

This disclosure relates to a system and method for the energy management and control of microgrids and/or power plant networks where distributed energy resources are deployed.

In a first embodiment a system of controlling a microgrid network is disclosed. The system comprises a plurality of distributed energy resources that supply electrical power to the microgrid network, and a plurality of loads coupled to the microgrid network and to the plurality of distributed energy resources. A controller is coupled to the microgrid network, to the distributed energy resources and to the loads. The controller comprising a processor and a memory coupled to the processor, and configured to execute a dispatch controller function block contained in the memory wherein, the function block is configured to cause the processor to receive a total power demand of all the loads coupled to the microgrid network and at least one operational constraint corresponding to the plurality of distributed energy resources and cause the processor to determine using the operational constraint if there is sufficient electrical power available from the plurality of distributed energy resources to power the loads. The function block is further configured to determine which of the plurality of available distributed energy resources are required to be adjusted to supply electrical power to the plurality of the loads, causing the controller to adjust the electrical power output by each of the distributed energy resources.

In a second embodiment a method of controlling a microgrid network is disclosed. The microgrid network includes a plurality of distributed energy resources that supply electrical power to the microgrid network and to a plurality of loads coupled to the microgrid network, the method comprising: providing a controller coupled to the microgrid network and to the distributed energy resources and to the loads, the controller including a processor and a memory coupled to the processor. The method further comprising executing by the processor a dispatch controller function block contained in the memory that receives a total power demand of all the loads coupled to the microgrid network and at least one operational constraint from each one of the plurality of distributed energy resources and determining by the function block using the received operational constraints if there is sufficient electrical power available from the plurality of distributed energy resources to power the loads. The method further includes determining by the function block which of the plurality of available distributed energy resources are required to be adjusted to supply electrical power to the plurality of the loads and adjusting the electrical power output of each of the distributed energy resources.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
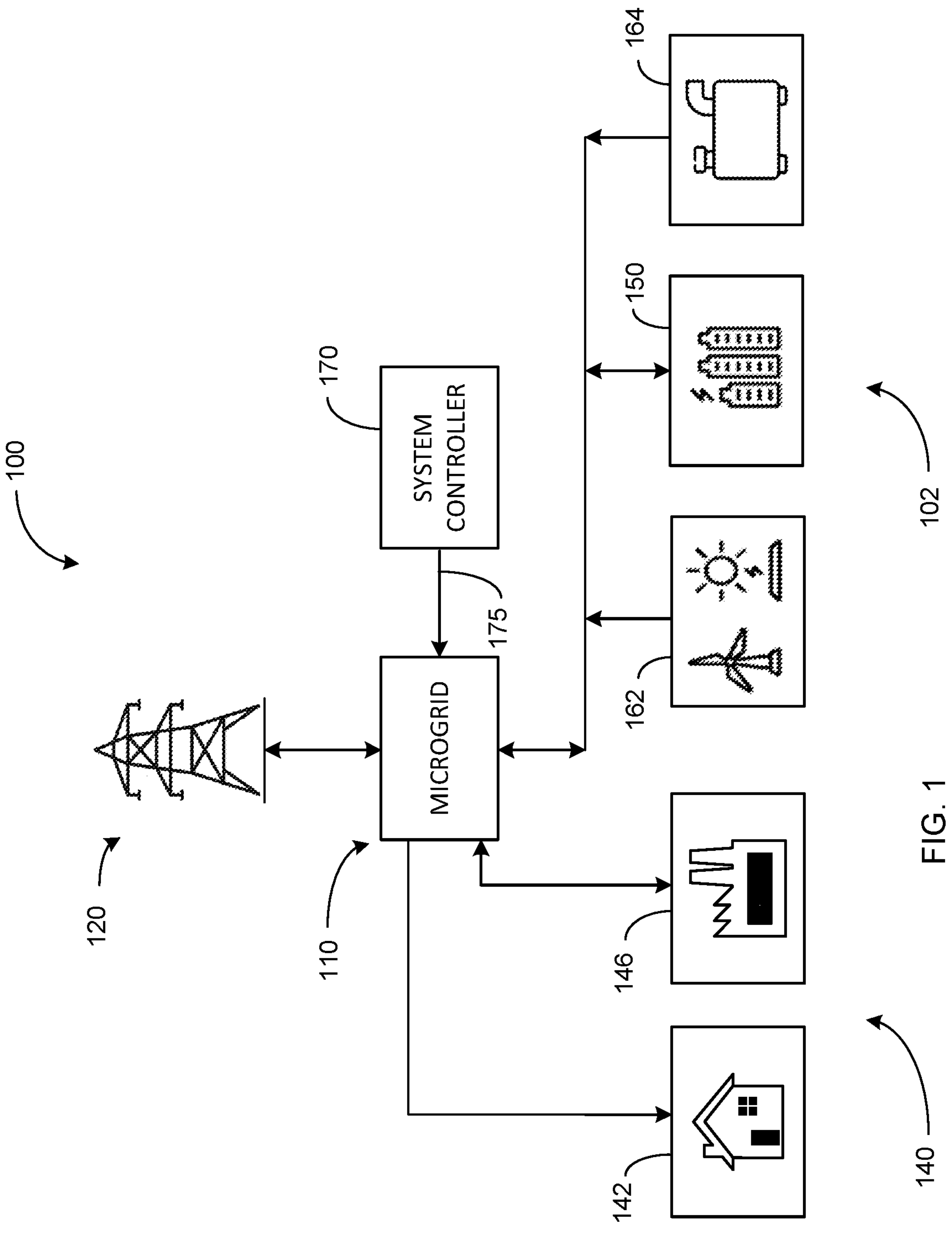
FIG. 1 illustrates in a schematic block diagram an electrical distribution system, in accordance with the present disclosure.

The figures discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

The embodiments of the methods, systems and apparatus described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, a suitable programmable computers may be a server, network appliance, set-top box, embedded device, computer expansion module, personal computer, laptop, personal data assistant, mobile device, or any other computing device capable of being configured to carry out the methods described herein. Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces implemented as hardware, software, and combination thereof.

Furthermore, the methods, systems and apparatus of the described embodiments are capable of being distributed in a computer program product including a physical non-transitory computer readable medium that bears computer usable instructions for one or more processors. The medium may be provided in various forms, including one or more diskettes, compact disks, tapes, chips, magnetic and electronic storage media, and the like. The computer usable instructions may also be in various forms, including compiled and non-compiled code.

In an electrical grid connected system, a microgrid serves its internal loads and depending on load-generation balance, could also potentially import or export power from/to a connected electrical grid. Power plants typically have very minor internal loads, and the main objective is to export power to the main grid for honoring commercial agreements and earn revenue. Microgrids and power plants operate with various driving philosophies and some of those are load frequency control, economic dispatch control, environmental dispatch control, security dispatch control, etc. With the fast growth and adoption of renewable energy, such as from solar, wind and battery energy storage systems (BESS), the energy management and control systems (EMCS) need to implement complex control schemes and methods to achieve the desired outcome based on the various operating philosophies of the microgrid and power plant. Different DERs have their own constraints and settings for optimal power delivery. For example, a diesel generator perform the best when it is run at an optimal set point. Furthermore, with heterogeneous types of DERs, there needs to be a supervisory logic that optimizes the power flow from different DERs. For example, such as a decision to utilize one DER before another of the same type or of a different type. Complex customized logic needs to be created in control systems to be able to coordinate between different energy resources while accommodating different constraints. Additionally, with the advent of newer technology and data driven techniques like machine learning, there becomes a need to simplify the control system configuration to focus on improving the performance and key performance indicators of the control system. The need calls for creating a system and method to easily integrate and operate different DERs in a way that specify the exact objectives to be achieved and to allow different operating philosophies for a number of DERs of same type, for multiple types of DERs and for the overall microgrid and power plant.

Reference is first made to FIG. 1 illustrating a schematic block diagram of an electrical distribution system 100 comprised of a microgrid network 110 connected to an electrical grid 120, in accordance with an example embodiment of the present disclosure. Microgrid network 110 comprises a plurality of distributed energy resources (DERs) 102, one or more loads 140 and a system controller 170. DERs 102 comprise one or more dispatchable energy resources 162 and 164 and one or more electronically coupled energy storage resources 150.

Electronically coupled energy storage resources 150 may comprise of one or more battery energy storage systems (BESS) connected to the microgrid 110 and to the one or more dispatchable energy resources 162 and 164. The DERs 102 are coupled to the loads 140 through the microgrid 110. The loads 140 may be any type of electrical load, such as for example residential or commercial buildings 142 or industrial and power plant facilities 146. Typically, the loads 140 will be time varying.

As used herein, the term "dispatchable" refers to an energy resource whose power output can be controlled or adjusted within a wide range as allowed by the operational constraints of the energy resource. For example, a diesel generator 164, when supplied with sufficient fuel can typically be controlled to provide a desired power output. Renewable energy sources 162 may be dispatchable to a certain extent due to the environmental conditions they operate within. For example, the power generated by a wind based energy resource, such as a wind turbine, is limited by the magnitude of the wind incident on its blades; a solar energy resource is limited by the amount of light that reaches its panel. The power generated by a wind turbine may be controlled to some extent by varying the pitch angle of the turbine's blades. However, in the absence of sufficient wind, the turbine will not generate any power.

As used herein, the term "electronically coupled energy resources" refers to energy resources of the system 100 that connect to an AC microgrid backbone via three-phase or single-phase DC-AC voltage-sourced converter (VSC). Electronically coupled energy resources 150 refer to energy resources capable of storing power, such as, for example, a BESS facility or container, etc.

Microgrid network 110 maintains certain parameters of the power supply, including frequency and voltage, within acceptable limits according to standards and operational guidelines to ensure the quality of the power supply. The frequency of the power network supply may vary depending on the balance between the total load-side consumption and generation of power to supply the microgrid 110. The voltage of the power network supply may vary depending on the balance between the total load-side consumption and generation of reactive power.

Various characteristics, including reactive power levels and short circuit level (or grid stiffness) of the power supply in microgrid networks vary constantly resulting in continuously changing characteristics of the power network. The microgrid 110 may, therefore, use complex control systems to maintain its voltage and frequency stability and guarantee an acceptable quality of power for consumers. Furthermore, in microgrid 110, demand continuously fluctuates and is generally not within the control of the power network operator. In addition, with proliferation of intermittent energy resources in the microgrid network, an additional element of unpredictability or at least unavailability of some energy resources may be added to the generation capacity.

Maintaining a balance between generation and demand in a microgrid 110 is important for reliable operation of the microgrid network. Sufficient mismatching of generation and demand may result in large frequency excursions on the system bus, which both lowers the overall efficiency of the power network and tends to increase equipment wear and damage resulting in increased maintenance costs. The described systems, methods and apparatus may, in addition to steady state control, allow fast dynamic control of real and reactive power to maintain the voltage and frequency stability of the microgrid 100 subsequent to system disturbances.

In microgrid networks, such as, for example, in the microgrid network 110, the DERs 102 have operational constraints that should be complied with to extend the service life time of the network and to minimize the maintenance costs of the DERs 102 and of the overall electrical distribution system 100. In various other cases of microgrids 110, the dispatchable energy resources 162, 164 may also have several operational constraints that may also need to be maintained to extend the service life time of the microgrid network 110. Examples of operational constraints for the dispatchable energy resources 162, 164, for a diesel power generation system 164, may include minimum loading and limited switching cycles. Different DERs 102 may have different costs and efficiencies associated with them. For example, operating a diesel generator 164 requires the consumption of diesel fuel. On the other hand, power obtained from a wind power generation resource 162 requires only sufficient wind. When sufficient wind is available, it is generally free. By increasing the penetration of specific energy resources, e.g., wind power generation, the system operator can reduce the cost of generation for the microgrid 110.

The present disclosure provides a method and system which allows a microgrid operator to achieve a desired operation based on a simple user friendly and configurable system that provides the best utilization of resources depending on types of DERs 102 connected to the microgrid 110 that allows defining the different operating philosophies for the overall plant as well as for the different DERs 102 contained in the microgrid 110.

An embodiment of the present disclosure defines and uses a specialized programmable dispatch controller function block (FB) executed by the system controller 170 that integrates the DERs connected to the microgrid 110. The FB forms the basis of a dispatch controller that dispenses with complex logic typically found in microgrid control systems. The FB manages the microgrid 110 with a number of dispatchable resource types by simply using parameterization without use of complex project engineering. The use of parameterization prevents drastic changes to the control logic of the controller when adding additional DERs to the microgrid 110.

As used herein, a "Function Block (FB)" is a packaged element of software that, when executed with a particular set of input values, produces a primary result. Function blocks are used primarily to specify the properties of a user function. In control systems such as in a programmable logic controller (PLC) a Function Block may include software programming and algorithms that can achieve a particular function within the control system such as for example a peripheral-integral-derivative controller.

Figure 2:
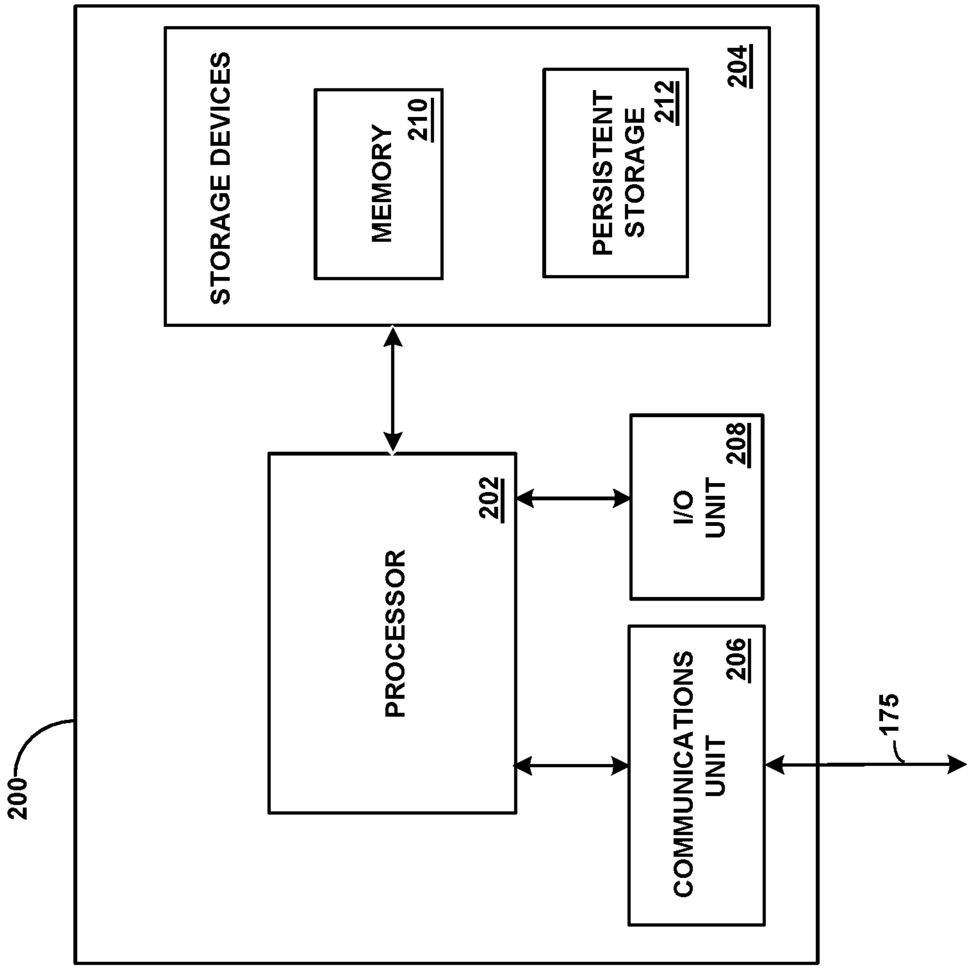
FIG. 2 illustrates schematically an example system controller, in accordance with the present disclosure.

FIG. 2 illustrates an example device 200 representing a microgrid controller system 170. The device 200 represents a controllers or other control system components used by microgrid control system 170 or any other suitable device supporting the control of energy management of a microgrid 110 to execute and run a dispatch controller FB on device 200. The key objectives of the dispatch controller is to look at all available dispatchable and electrically coupled energy-sources to reduce the fuel consumption in case of a diesel generator, increase the consumption of dispatchable renewable energy, and if connected to electrical grid 120 lessen the energy consumption from the electrical grid 120.

As shown in FIG. 2, the device 200 includes at least one processor 202, at least one storage device 204, at least one communications unit 206, and at least one I/O unit 208. Each processor 202 can execute instructions, software, and function blocks such as those that may be loaded into memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, flash memory, or optical disc.

The communications unit 206 supports communications with other systems or devices. For example, the communications unit 206 could include at least one network interface card or wireless transceiver facilitating communications over at least one wired or wireless network 175. As a particular example, the communications unit 206 could support communications with one or more sensors, data communication units embedded in DERs 102 or sensors and sensing devices that can monitor the electrical loads 140 connected to the microgrid 110. As another particular example, the communications unit 206 could support communications with higher-level components of a PLC/SCADA control network (not shown) wirelessly or by wires to provide information to and control data from an operator station(s).

The I/O unit 208 allows for input and output of data. For example, the I/O unit 208 may provide a connection for user input through a keyboard, mouse, keypad, touchscreen, local operator device, or other suitable input device. The I/O unit 208 may also send output to a display, printer, or other suitable output device.

Although FIG. 2 illustrates one example of a device 200 for implementing the disclosure, various changes may be made to FIG. 2. For example, various components in FIG. 2 could be combined, further subdivided, or omitted, and additional components could be added according to particular needs. Also, computing devices can come in a wide variety of configurations, and FIG. 2 does not limit this disclosure to any particular configuration of device.

Figure 3:
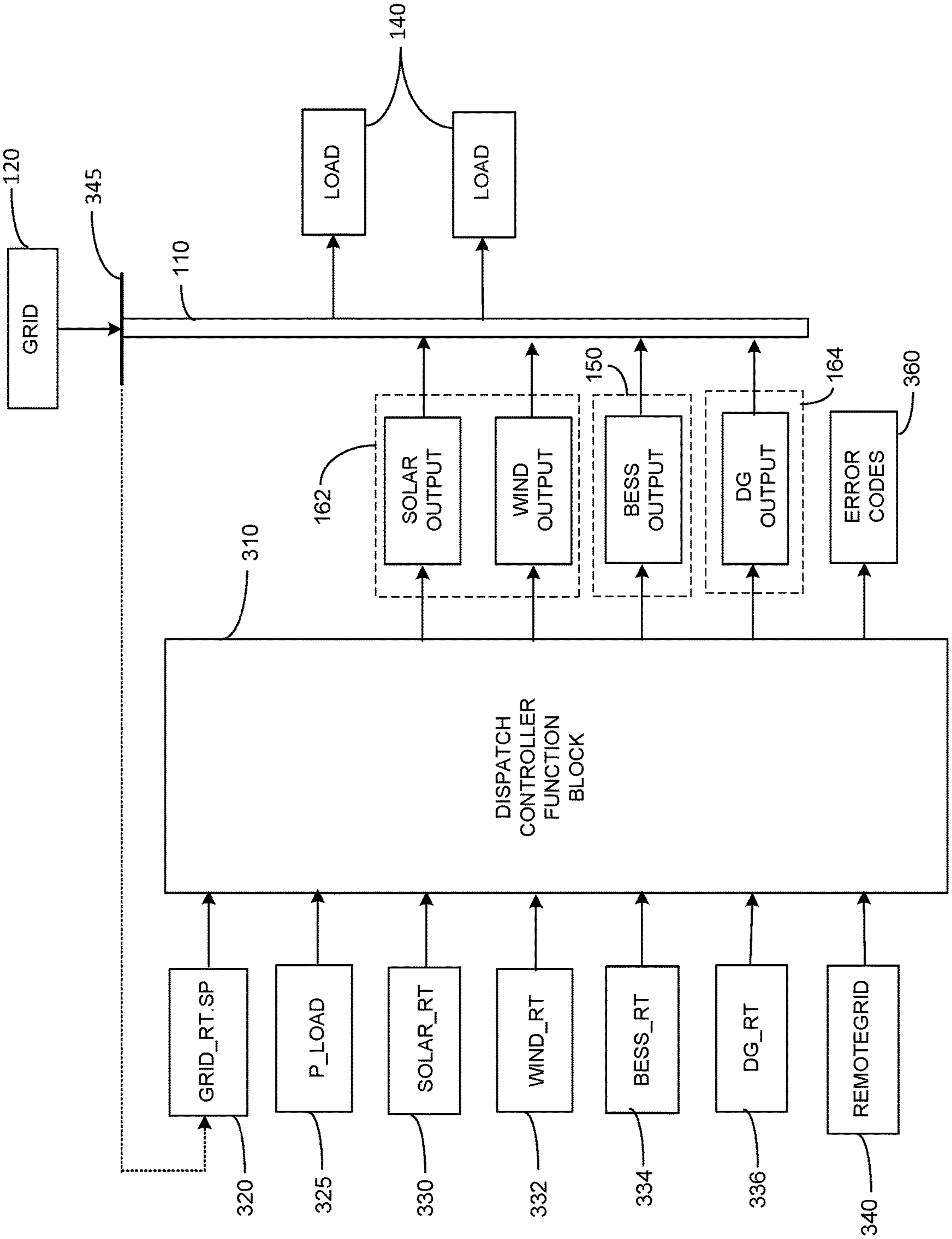
FIG. 3 illustrates in a functional block diagram the dispatch controller Function Block, in accordance with the present disclosure.

With reference to FIG. 3 the dispatch controller FB 310 of the present disclosure is illustrated. The FB 310 provides a configurable software program which can be executed by controller 200 to provide:

i. parameters to read the electrical load to be supported;
ii. parameters to read the power generation potential from various DERs connected to the microgrid 110;
iii. parameters to configure the number of several types of DERs connected in the microgrid 110 and system 100; and iv. parameters to set dispatch options for the microgrid 110 or any power plant connected to the microgrid by specifying, ordered dispatch, unit wise order and predictive dispatch.

The FB 310 further provides parameters to set dispatch options for the individual resource types. For example, using algorithms executing in the FB 310 the BESS 150, may be operated to provide equal/proportional sharing, battery cycle optimization, levelized SOC, and external control. The FB 310 may provide parameters for the diesel dispatchable energy resource 164. For example, using algorithms executing in the FB 310 the diesel dispatchable energy resource 164 may be operated to provide equal/proportional sharing, optimal setpoint, order between multiple generators and external control.

For microgrid 110 connected to the electrical grid 120, the FB 310 can incorporate settings for electrical power import/export limits, curtailment signals, and demand resource signals.

The FB 310 may also provide parameters to indicate the status of each DER 102 connected to the microgrid 110 to determine if a dispatchable energy resource 162, 164 or energy storage resource 150 is in use or can be used to power the microgrid 110.

The FB 310 is arranged to evaluate all the inputs to check the status of individual DERs 102, checks the required generation against the current load conditions from loads 140 and adjusts the output setpoints to individual DERs to achieve the desired outcomes. For example, the reduction of the fuel consumption of the diesel energy resource 164 or increasing the consumption of renewable energy and if connected to the electrical grid 120, reducing utility power consumption.

Input parameters to the dispatch controller FB 310 includes a grid setpoint input (GRID_RT.SP) 320. The GRID_RT.SP 320 parameter is the grid setpoint which defines the import/export power demand from grid 120. Depending on the grid setpoint indicating either the import or export of power from grid 120 to the microgrid 110, the parameter setting is considered as either a load (export) or available power (import). The input values on the GRID_RT.SP input 320 can include a −ve value indicating a grid import requirement that the microgrid must meet to power the loads connected to the microgrid. A +ve value indicating a grid export capacity requirement that the microgrid must meet, and 0ve value indicating no grid demand. A MaxImport and MaxExport value (not shown) would limit the import/export. MaxImport and MaxExport limitations apply when the GRID_RT.SP is 0. GRID_RT.SP represents the Point of Interconnection (POI) 345 power reference.

The POI is the point at which the microgrid 110 is connected to grid 120. Limits for the import and export from the grid are set depending on the agreements with the utility generating and distributing power to the grid 120. The power import/export can be considered as a fixed or varying as per any agreement with the utility. If the committed power has to be delivered to the grid, the amount of power that needs to be delivered should be made available by the user. This may be a fixed value for the day (and may repeat everyday) or may be a value that is different for various times of the day. If the microgrid 110 operator wishes to deliver the committed power to the utility, then this will form the basis for power import/export. The POI 345 is then considered as the committed power output and fed as an input to the FB 310. The measurements at the POI 345 gives the power import/export values.

P_LOAD 325 is the measurement of the total of all loads connected to the microgrid 110. The total load may be taken from multi-function meters (MFM) (not shown) connected at the loads 140. The electrical network within the microgrid 110 may have a number of loads connected at various locations. All these loads are connected to a number of feeders that will eventually terminate at a common busbar (where the load measurements will be made) and the loads added to each other to provide a reading of the total load of the microgrid 110.

Parameters of the input's status of any DERs 102 connected to the microgrid 110 are also input to the FB 310. The SOLAR_RT input 330 provides data to the FB 310 of the measured actual output that can be provided to the controller from the solar dispatchable resources 162. This could include inputs providing the total number of solar units available to the microgrid 110. FB 310 using the SOLAR_RT input 330 parameters calculates the total solar power available from the solar dispatchable resources 162 for use by the microgrid 110. The output from the FB 310 is a setpoint and curtailment input to the solar dispatchable resources 162 of DER 102.

The WIND_RT input 332 provides data to FB 310 of the measured actual output provided to the controller from any wind dispatchable resources 162. The WIND_RT input 332 provides data to FB 310 of the measured actual output that can be provided to the controller from the wind dispatchable resources 162. This could include inputs providing the total number of wind generator units available to the microgrid 110. FB 310 using the WIND_RT input parameters calculates the total amount of wind power available from the wind dispatchable resources 162 for use by the microgrid 110. The output from the FB 310 is a setpoint and curtailment input to the wind dispatchable resource 162.

The BESS_RT input 334 provides data to the FB 310 of the measured actual voltage output that can be provided by a BESS, its state of charge (SOC) and the time when the BESS is active. The output from the FB 310 is a power reference (Pref) that the BESS 150 needs to dispatch to the microgrid 110.

The DG_RT input 336 provides data to the FB 310 of each diesel dispatchable resource 164 that is on-line and operational and each generators measured actual power output, its fuel level, and its efficiency that can be generated from any diesel dispatchable resource 164 connected to the microgrid 110. The output from the FB 310 is a start/stop signal and setpoint to the DG dispatchable resources 164.

The FB 310 algorithm achieves a load/generation balance by prioritizing renewable energy sources such as the solar and wind resources 162 over the BESS 150, DG 164, and grid 120. The FB 310 evaluates and checks the status of individual DERs, 102 connected to the microgrid 110 and the required generation against the current load conditions and adjusts the output setpoints to the individual DERs to achieve the desired outcomes such as, the fuel consumption of the diesel dispatchable resource 164, or increasing the consumption of renewable energy from dispatchable resource 162 and if connected to the electrical grid 120, reducing utility power consumption.

The REMOTEGRID input 340 provides an input parameter to the FB 310 to define if the microgrid 110 is on or off the grid 120. Remote microgrids are physically isolated from the grid 120 and operate in an island mode at all times due to the lack of available and affordable transmission or distribution infrastructure. Grid-connected microgrids have a physical connection to the utility grid via a switching mechanism at the point of common coupling (PCC), but they also can disconnect into island mode and reconnect back to the main grid as needed. In a grid-connected microgrid scenarios, a microgrid that is effectively integrated with the utility service provider can provide grid services (e.g., frequency and voltage regulation, real and reactive power support, demand response, etc.) to help address potential capacity, power quality and reliability, and voltage issues on the grid 120.

The FB 310 can also output error codes 360 as alarms and notifications to an operator station (not shown). The error codes provide an indication of the status of the dispatch controller FB 310. The error codes provided may include at least alarms and notifications that the resources connected to the FB 310 are exhausted.

Figure 4:
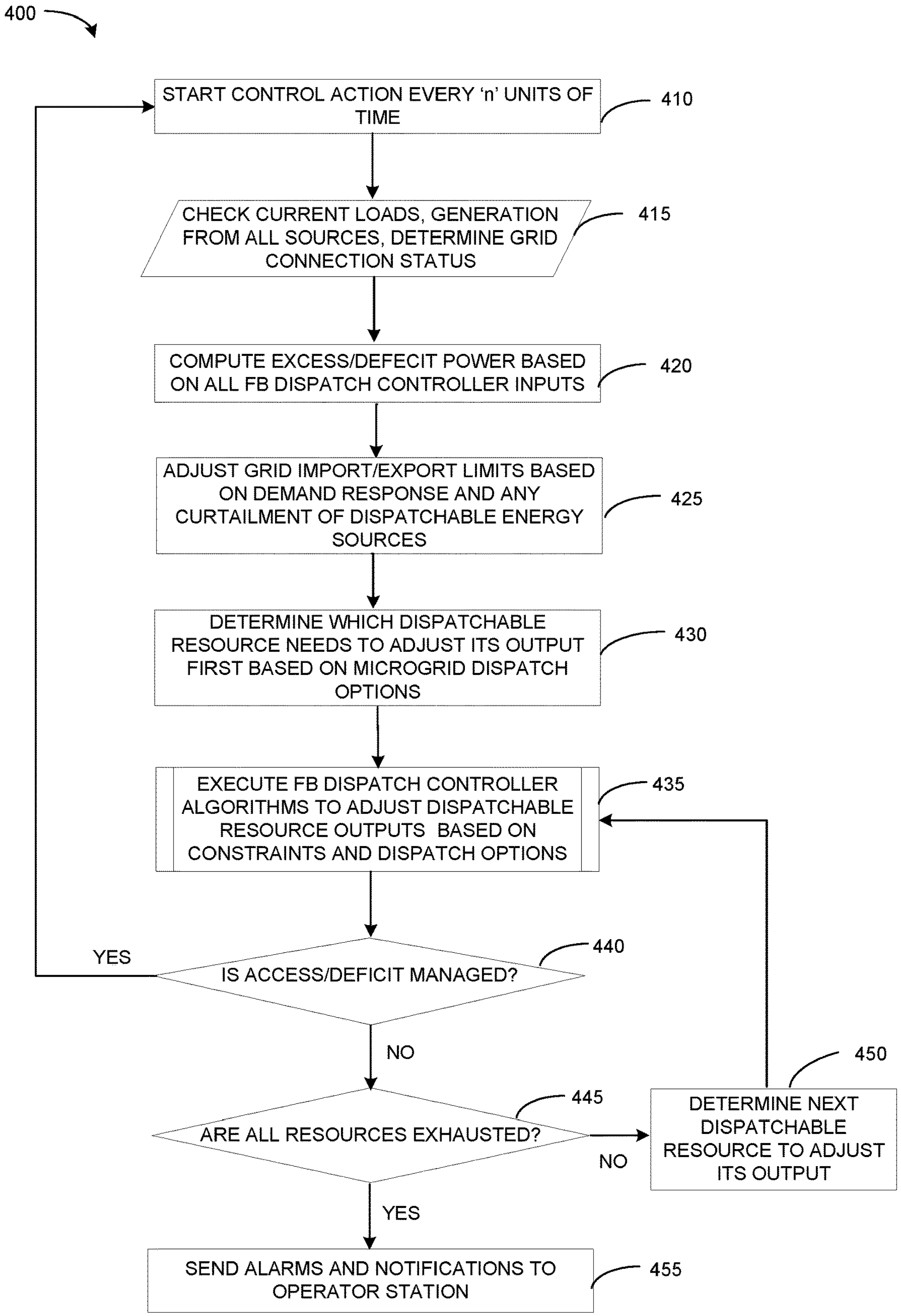
FIG. 4 illustrates in a block diagram, the method for controlling a microgrid using the dispatch controller Function Block, in accordance with the present disclosure.

FIG. 4 illustrates in a block diagram, an exemplary method 400 for using the FB dispatch controller 310 to manage microgrid network 110 connected to a grid 120 and having a plurality of DERs 102, comprised of one or more dispatchable energy resources 162 and 164 and one or more electronically coupled energy storage resources 150. The FB 310 is executed by the control system 170 at a set period of time 410 to launch the method 400. The period of time when the FB 310 is executed could be based on the demand of the loads connected to the microgrid, or at a time when historically the loads connected to the microgrid 110 are at peak demands.

Next in step 415, the FB 310 checks the total of all the loads connected to the microgrid 110 using the P_LOAD input signal 325 applied to FB 310. Further, the FB 310 checks the status and available power of any DERs 102 connected to the microgrid 110. For example, the SOLAR_RT input 330 is used to input data and status of the availability of any solar resources of the dispatchable resource 162 and the actual power that the solar resources can provide to the microgrid 110. Similarly, the WIND_RT input 332 provides data to the FB 310 of the availability of any wind resources to provide power to the microgrid from the dispatchable resource 162. Additionally, the operational status and available power from the other DERs 102 connected to the microgrid 110, such as the BESS 150 and diesel generating sources 164 is input to the FB 310. Finally, the GRID_RT.SP 320 setpoints from the grid 120 is input to FB 310. This input defines the import/export power demand of grid 120. As explained above, the grid 120 can include import/export limits, curtailment of power to or from the grid 120 set by utility that either imports (provide power to) or exports (draw power from) the microgrid 120.

Next in step 420, the FB 310 computes if an excess or a deficit of power is available to adequately power the loads connected to the microgrid 110 at time "n" and examines in step 425 the grid 120 import/export limits input to the FB 310 applied to GRID_RT_SP 320, to ascertain how much power can be provided to the microgrid 110 from grid 120. The grid 120 import/export setpoints are adjusted based on available grid power, power curtailments, and the availability of adequate power from dispatchable energy sources 162, 164 of the DERS 102, For example, if the wind generators are operating to provide adequate power from dispatchable resource 162.

In step 430, FB 310 determines which dispatchable resource 162, 164 need to be adjusted in order to provide power to the loads. For example, if an excess amount of power is available, import limits of the various DERs 102 may be adjusted in an ordered demand to use the most cost efficient energy source. For example, if renewable energy from the solar or wind sources of dispatchable energy resource 162 are adequate, these energy sources would be favored and brought on line while curtailing stored battery power from the BESS 150 and/or the power generated from the diesel generators of dispatchable energy source 164.

On the other hand, if the calculation signifies a shortfall or a deficit of power, more power may be drawn from the grid 120, up to the grids 120 export limits, maximum battery power may be drawn from the BESS 150, and the diesel generator operated at a maximum rate, to provide the power to satisfy the loads connected to the microgrid 110.

The FB 310 in step 435 executes a dispatchable algorithm to adjust the dispatchable resource outputs 162, 164 and BESS 150 individually, based on operating constraints, such as for example, if the wind generators are providing power, the solar panels are generating power, there is adequate SOC in the storage batteries of a BESS unit 150 and if the diesel generator of dispatchable resource 164 is online. Use of the connected DERs 102 are adjusted based on the above listed options. Each dispatchable resource is adjusted individually and a test is performed in step 440 to ascertain if the adjusted resource manages the microgrids power 110 demand. If adjustments made in step 435 manages the loads of microgrid 110, then the method branches back to step 410, and the method restarted. However, if the access or deficit power demand is not adequately managed, the FB 310 tests in step 445 if all the DERs resources have been exhausted. If they have not, the next dispatchable resource that may be adjusted is identified in step 450 and the dispatchable algorithm executed again in step 435. Again, if the microgrid 110 demand is found to be managed in step 440 the method 400 branches to step 410. If the demand is found not to be managed and all dispatchable resources exhausted in step 445, alarm and notifications are sent at step 455 to the operator's station, informing system operators or users of the energy shortfall of the microgrid 110.

As explained above, the FB 310 evaluates all the inputs applied to the dispatch controller to check the status of individual DERs and the required resource generation against the current load conditions of the microgrid 110. The FB 310 adjusts the output set points to individual DERs to achieve the desired outcomes, such as for example, reduction of the fuel consumption in case of a diesel generator dispatchable resource 164, increase in the consumption of renewable energy from dispatchable energy resources 162 and if connected to grid 120, reduction of utility power consumption.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system of controlling a microgrid network, wherein the system comprising:

a plurality of distributed energy resources configured to supply electrical power to the microgrid network, wherein the microgrid network is further configured to receive the power supply from an electrical grid;

a plurality of loads coupled to the microgrid network and to the plurality of distributed energy resources; and a controller coupled to the microgrid network, to the plurality of distributed energy resources and to the plurality of loads, wherein the controller comprising a processor and a memory coupled to the processor, wherein the processor configured to execute a dispatch controller function block contained in the memory wherein:

the dispatch controller function block is configured to cause the processor to:

receive a power demand from the plurality of loads coupled to the microgrid network, at least one operational constraint comprising output setpoints corresponding to the plurality of distributed energy resources and at least one electrical grid operational constraint comprising import setpoints and export setpoints provided by the electrical grid;

determine, using the at least one operational constraint, if there is sufficient electrical power available from the plurality of distributed energy resources to power the loads;

determine, using the at least one electrical grid operational constraint, if sufficient power supply is available to be imported from the electrical grid for use by the plurality of loads;

determine, using the at least one operational constraint and the at least one electrical grid operational constraint, adjustments required for at least one of the plurality of distributed energy resources and the electrical grid to supply the electrical power to the plurality of the loads;

control, based on the determined adjustment, the output setpoints of at least one distributed energy source from the plurality of distributed energy resources to match energy supply requirement for the plurality of loads; and control, based on the determined adjustment, the import setpoints and the export setpoints of the electrical grid to match energy supply requirement for the plurality of loads;

wherein to control, based on the determined adjustment, the output setpoints of at least one distributed energy source, the import setpoints and the export setpoints of the electrical grid to match energy supply requirement for the plurality of loads, the processor is further configured to:

iteratively adjust the at least one distributed energy resource among the plurality of distributed energy resources by:

(i) modifying an output setpoint of one or more first distributed energy resources of the plurality of distributed energy resources at a time instant based on the determined adjustments while holding output setpoints of other distributed energy resources of the plurality of distributed energy resources constant during the modifying;

(ii) after each modifying, determining whether the power demand of the plurality of loads is satisfied; and (iii) on determining the power demand of the plurality of loads is not satisfied, selecting one or more second distributed energy resources from the plurality of distributed energy resources and repeat (i)-(ii) till the power demand of the plurality of loads is satisfied, wherein the one or more second distributed energy resources are different from the one or more first distributed energy resources.

2. The system of claim 1, wherein the controller causes the dispatch controller function block to determine using the electrical grid operational constraint and the import setpoints or the export setpoint limits if sufficient electrical power is being generated by the plurality of distributed energy resources to be exported to the electrical grid.

3. The system of claim 1, wherein the controller causes the processor to send an alarm to an operators station when it is determined by the dispatch controller function block using at least one of the operational constraints from the plurality of distributed energy resources that the electrical power available from the plurality of distributed energy resources have been exhausted and the import setpoints from the electrical grid will not sufficiently provide electrical power to the plurality of loads signaling an energy shortfall for the microgrid network.

4. The system of claim 1, wherein the plurality of distributed energy resources comprises at least one dispatchable energy resource.

5. The system of claim 4, wherein the dispatchable energy resource comprises:

a plurality of solar energy units and the dispatch controller function block is further configured to receive data from one or more solar energy units that are on-line and available to the microgrid network and total solar power being produced by the solar energy units and available to the plurality of loads.

6. The system of claim 4, wherein the dispatchable energy resource includes a plurality of wind generator units and the dispatch controller function block is further configured to receive data from one or more wind generator units that are on-line and available to the microgrid network and total wind generated power being produced by the plurality of wind generator units and available to the loads.

7. The system of claim 4, wherein the dispatchable energy resource includes a plurality of diesel generator units and the dispatch controller function block is further configured to receive data from one or more number of diesel generator units that are on-line and available to the microgrid network and an actual power output and its efficiency that can be generated by each on-line diesel generator unit and available to the plurality of loads.

8. The system of claim 1, wherein the plurality of distributed energy resources comprises at least one electronically coupled energy resource.

9. The system of claim 8, wherein the electronically coupled energy resource includes at least one battery energy storage system (BESS) capable of storing and transmitting electrical energy and the dispatch controller function block is further configured to receive data from the BESS of its state of charge and voltage output that can be made available to the plurality of loads.

10. A method of controlling a microgrid network, comprising:

executing, by a processor, a dispatch controller function block for:

receiving a power demand from plurality of loads coupled to the microgrid network;

receiving at least one operational constraint comprising output setpoints from each one of a distributed energy resource of a plurality of distributed energy resources;

receiving at least one electrical grid operational constraint comprising import setpoints and export setpoints provided by an electrical grid;

determining, using the at least one operational constraint if there is sufficient electrical power available from the plurality of distributed energy resources to power the plurality of loads;

determining, using the at least one electrical grid operational constraint, if sufficient power supply is available to be imported from the electrical grid for use by the plurality of loads;

determining, using the at least one operational constraint and the at least one electrical grid operational constraint, adjustments required for at least one of the plurality of distributed energy resources and the electrical grid are to supply electrical power to the plurality of the loads;

controlling, based on the determined adjustment, the output setpoints of at least one distributed energy resource from the plurality of distributed energy resources to match energy supply requirement for the plurality of loads; and controlling, based on the determined adjustment, the import setpoints and the export setpoints of the electrical grid to match energy supply requirement for the plurality of loads, wherein controlling, based on the determined adjustment, the output setpoints of at least one distributed energy source, the import setpoints and the export setpoints of the electrical grid to match energy supply requirement for the plurality of loads, comprises:

iteratively adjusting the at least one distributed energy resource among the plurality of distributed energy resources by:

(i) modifying an output setpoint of one or more first distributed energy resources of the plurality of distributed energy resources at a time instant based on the determined adjustments while holding output setpoints of other distributed energy resources of the plurality of distributed energy resources constant during the modifying;

(ii) after each modifying, determining whether the power demand of the plurality of loads is satisfied; and (iii) on determining the power demand is not satisfied, selecting one or more second distributed energy resources from the plurality of distributed energy resources and repeat (i)-(ii) till the power demand of the plurality of loads is satisfied, wherein the one or more second distributed energy resources are different from the one or more first distributed energy resources.

11. The method of claim 10, wherein the dispatch controller function block determine using at least one the operational constraint and the import setpoints, and export setpoints if sufficient electrical power is being generated by the plurality of distributed energy resources to be exported to the electrical grid.

12. The method of claim 11, further comprises, sending an alarm to an operators station when it is determined by the dispatch controller function block using the at least one operational constraints from the plurality of distributed energy resources that the electrical power available from the plurality of distributed energy resources have been exhausted and the import setpoints from the electrical grid will not sufficiently provide electrical power to the plurality of loads signally an energy shortfall of the microgrid network.

13. The method of claim 10, wherein the plurality of distributed energy resources comprises at least one dispatchable energy resource.

14. The method of claim 13, wherein the at least one dispatchable energy resource comprises at least: a plurality of solar energy units and the dispatch controller function block receives data from one or more solar energy units that are on-line and available to the microgrid network and total solar power being produced by the plurality of solar energy units available to the plurality of loads.

15. The method of claim 13, wherein the dispatchable energy resource includes a plurality of wind generator units and the dispatch controller function block is further configured to receive data from one or more wind generator units that are on-line and available to the microgrid network and total wind generated power being produced by the plurality of wind generator units and available to the loads.

16. The method of claim 13, wherein the dispatchable energy resource includes a plurality of diesel generator units and the dispatch controller function block is further configured to receive data from one or more number of diesel generator units that are on-line and available to the microgrid network and an actual power output and its efficiency that can be generated by each on-line diesel generator unit and available to the plurality of loads.

17. The method of claim 10, wherein the plurality of distributed energy resources comprises at least one electronically coupled energy resource.

18. The method of claim 17, wherein the electronically coupled energy resource includes at least one battery energy storage system (BESS) capable of storing and transmitting electrical energy and the dispatch controller function block is further configured to receive data from the BESS of its state of charge and voltage output that can be made available to the plurality of loads.

* * * * *